Dec. 4, 1934.　　　L. DE FLOREZ　　　1,982,644
FLUID VALVE
Filed Oct. 1, 1930　　　2 Sheets-Sheet 1

Inventor
Luis de Florez
By his Attorneys

Dec. 4, 1934.  L. DE FLOREZ  1,982,644
FLUID VALVE
Filed Oct. 1, 1930   2 Sheets-Sheet 2
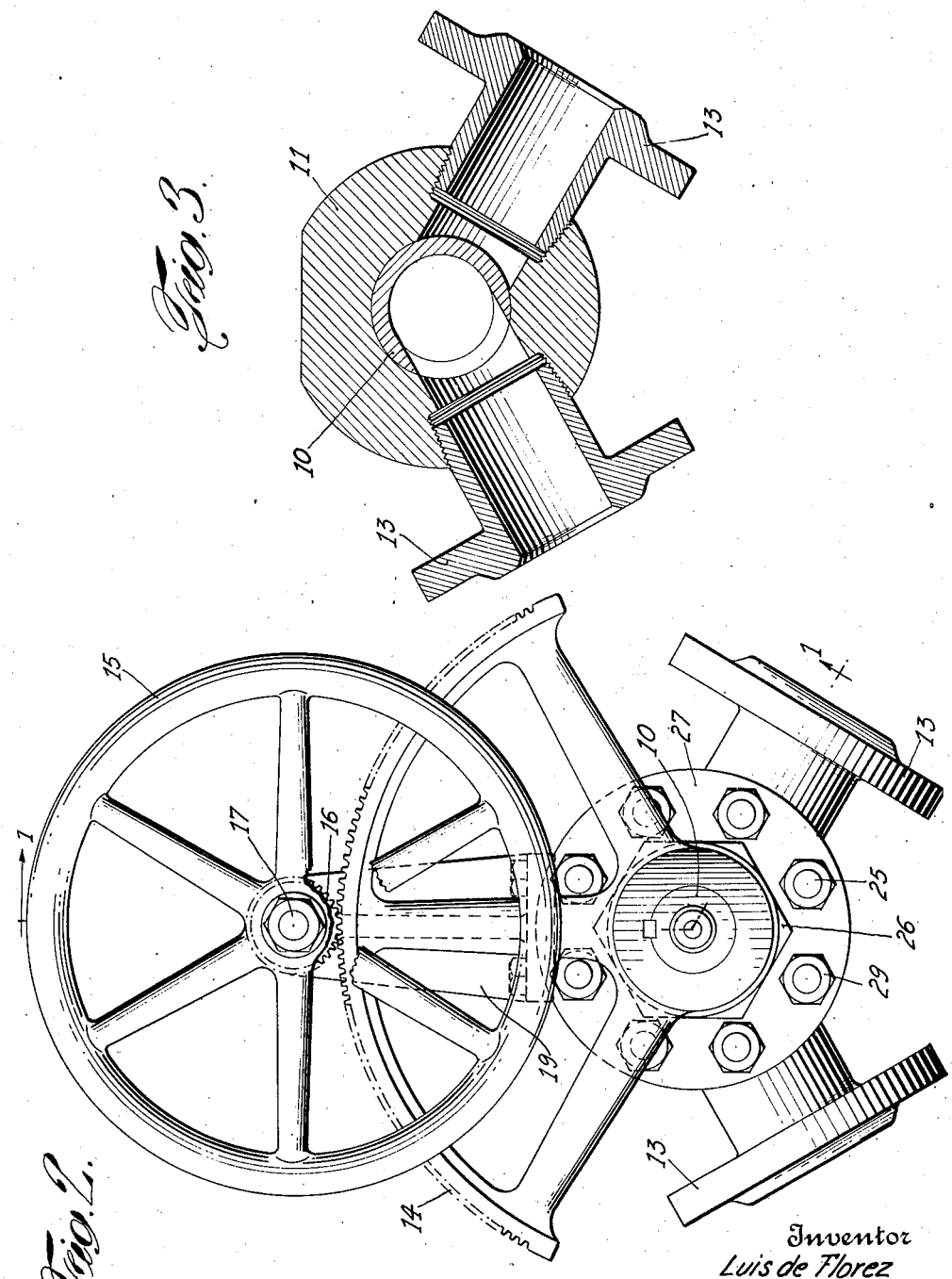
Inventor
Luis de Florez
By his Attorneys
Hoguet Meary Patented Dec. 4, 1934

1,982,644

UNITED STATES PATENT OFFICE 1,982,644

FLUID VALVE

Luis de Florez, Pomfret, Conn.

Application October 1, 1930, Serial No. 485,593

1 Claim. (Cl. 251—91)

This invention relates to devices for occasioning directional changes in a flowing stream of fluid. In its broader and more general aspects the invention is concerned with means for changing the destination of fluid flow without interruption of said flow during said change. More particularly the invention provides a valve mechanism having a single inlet and a plurality of alternative outlets with means for transferring the fluid efflux from an originally selected outlet to any alternative outlet without other substantial modification of the flow due to such transfer.

While the device finds general industrial application in the transfer of fluids from one point to another, the invention has particular utility in controlling the flow of corrosive or sediment depositing fluids in the vapor state at high temperatures. In this connection the device overcomes certain disadvantages of prior devices of similar character since means are provided for avoiding interference with the efficient operation of the device due to the characteristics of such fluids.

In the drawings.

Fig. 2 depicts, in elevation, one end of the device showing a turning mechanism integral therewith.

Fig. 3 is a vertical section on the line 3—3 in Fig. 1.

Figure 1:
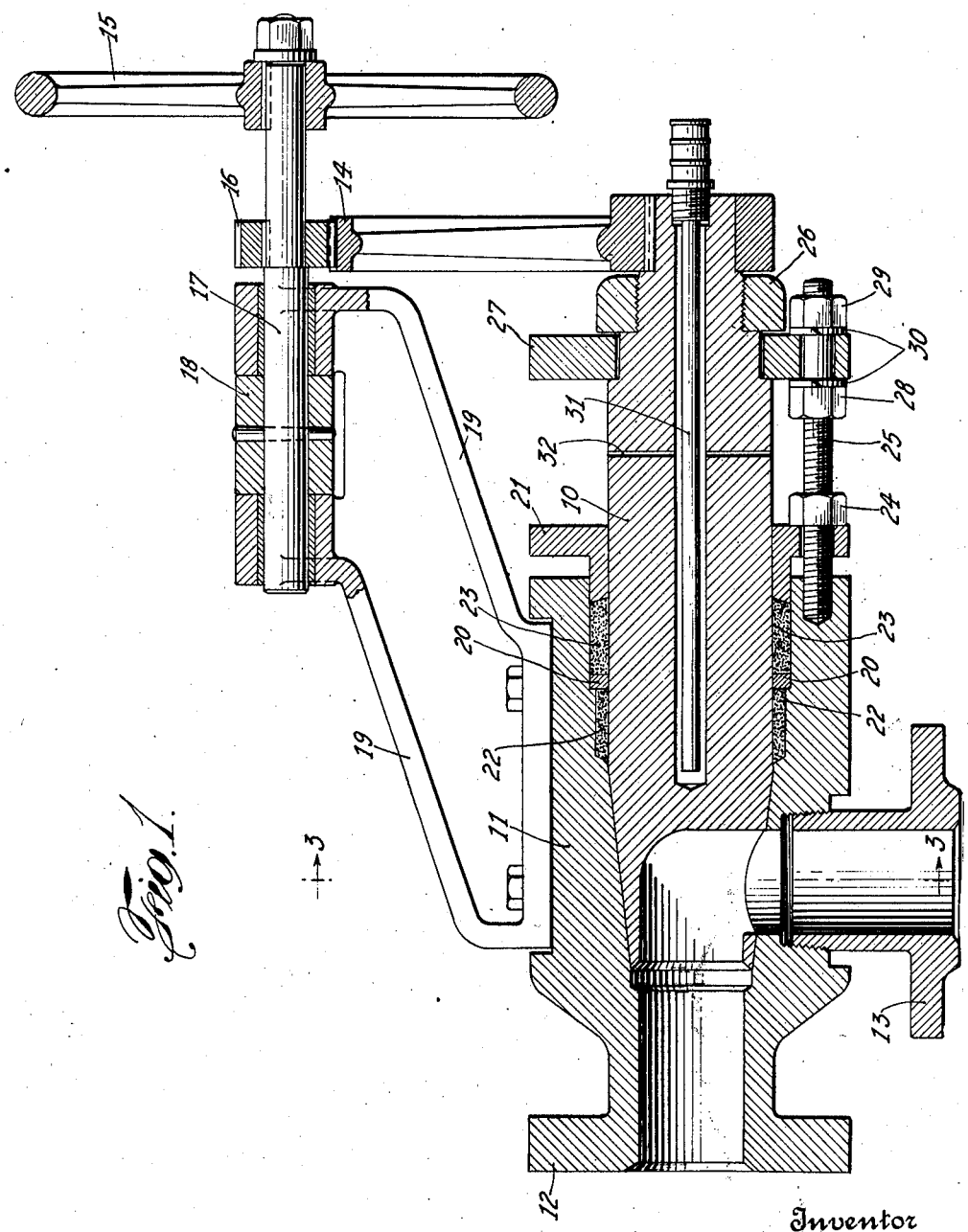
Fig. 1 depicts, in side elevation with parts in section, one form of the device.

Referring to Fig. 1 in the drawings, the device comprises a plug 10 partially projecting into one end of a valve casing 11 and adapted to move therein. The opposite end 12 of the casing 11 is flanged to provide means for attaching the device to a conduit (not shown) and forms an inlet for the influx of vapors to the device. A plurality of flanged outlet nipples 13 are attached to the casing 11, and are circumferentially disposed thereto with the centers of said outlets lying in a single plane perpendicular to the longitudinal axis of said casing. In the drawings, the device is shown with two outlets only but the invention is not intended to be limited in scope thereby since the device may be provided with any desired number of outlets commensurate with the dimensions thereof.

The plug 10 is recessed at its inner end to provide for the directionally controlled passage of fluids through the device. In order to avoid undue turbulence resulting from the change of direction of flow, the said recess is formed entirely of smooth curved surfaces, thus maintaining, as far as possible, a stream line flow of fluid through the device. When handling certain fluids, particularly vapors at high temperature, it is desirable to avoid expansion or contraction of said flowing fluid. For such utilization of the device the recessed portion of the plug 10 may conveniently be so proportioned as to present an area of constant cross section of the same magnitude as the area of the inlet 12 to the path of fluid flow. In such cases the outlets 13 are also so constructed as to have the same cross sectional areas as the area of the inlet. The invention is not, however, limited in either scope or industrial application to such construction.

It will be noted in the attached drawings that the plug 10 makes a beveled contact within the casing 11, said plug being so disposed within said casing as to have the longitudinal axis of the plug passing through the center of the inlet 12. It is to be clearly understood that the invention contemplates, in addition to this depicted assembly of parts, such a construction as will occasion the plug 10 entering the casing 11 at an angle to the longitudinal axis thereof. It is also contemplated that the contact surfaces between the plug 10 and the casing 11 may consist of parallel lines as a logical modification of the beveled contact shown without deviating from the spirit of the invention. However, the inner end of the plug 10 should face the inlet of the casing 11 in order to provide for uninterrupted flow of fluid into the open end of the recess.

Metallic packing rings 20 and 21 are supplied between the outer surface of the plug 10 and the inner surface of the casing 11 along a portion of the length of the device adjacent the area of contact between these two members. The escape of fluids is further guarded against by inserting graphite or other pliable packing material in the annular spaces 22 and 23. The set nut 24 carried by the bolt 25 serves to hold the packing arrangement in place.

Movement of the plug 10 about its axis within the casing 11 is effected by means of a self-contained turning mechanism, of which one form and mode of connection is indicated in Figures 1 and 2. The end elevation presented in Figure 2 depicts a gear quadrant 14 carried by the plug 10, movement of which is occasioned by means of the hand wheel 15 through the medium of the spur gear 16 and the shaft 17. The shaft 17 turns in the bearing 18 supported by the superstructure 19 attached to the casing 11 as shown in Figure 1. The strain occasioned by the operation of the turning mechanism is thus wholly taken up by the device itself, being divided between the casing 11 and the plug 10, as oposed to the usual means, adapted to turning such a plug, which are not integrally related to the device itself. The arc of the gear quadrant 14 will of course be determined by the number and location of the casing outlets.

In order to facilitate turning the plug 10 upon its axis at the time of effecting a directional change in the fluid flow when corrosive or coke-forming fluids are passing through the device, means are provided for withdrawing the plug 10 from its seat within the casing 11, a slight amount prior to turning. Such means in the depicted embodiment of the invention comprise a collar and bolt arrangement consisting of the collars 26 and 27 on the plug 10 and the bolt 25 carrying a nut 28 for withdrawing the plug and a nut 29 for seating the plug. The collar 26 is attached to the plug 10 by suitable threaded connection as indicated, while the collar 27 encircles the plug but rides free thereon. Suitable spring washers 30 are inserted between the surfaces of the nuts 28 and 29 and the collar 27 to relieve the strain on the bolt 25 during periods of contraction or expansion of the plug while the device is in operation.

The plug 10 is also provided with means for cooling the same in order to further facilitate "breaking away" the surface of contact between the casing 11 and the plug 10 by contracting the latter prior to turning. In the depicted embodiment of the invention such cooling means comprise the longitudinal channel 31 for the inflow of steam or other fluid cooling medium and the exhaust channels 32.

A further feature of the device consists in having the plug 10 formed of material with a lower coefficient of expansion than the material of the casing 11. The degree of expansion, when fluids at high temperature are passing through the device, will then be greater for the casing 11 than for the plug 10 thus preventing "seizing" at the surface of contact during operation.

The device when adapted to its intended use is located in a fluid conduit system, connecting the flange 12 to a conduit carrying fluids toward the device and connecting with the plurality of casing outlets a corresponding number of fluid conduits, leading to points of fluid destination, by means of the flanged nipples 13 with which the casing is provided. Flow of fluid through the device is established by turning the hand wheel 15 through an arc sufficient to bring the outlet opening of the recess in the plug 10 directly opposite that outlet aperture in the casing 11 through which efflux of fluid is desired. Referring to Figure 3 it will be seen that during passage of fluid through one outlet nipple, the remaining outlet aperture (or apertures in a casing carrying more than two outlets) is completely closed to fluid efflux.

To effect a change in fluid destination, during a period of fluid flow, the plug 10 is turned, by means of the hand wheel 15 and intervening gear mechanism, sufficiently to position the outlet opening of the recessed portion in line with an alternative outlet aperture in the casing 11. In the interval required for effecting the desired directional change, fluid flows from the device through both casing outlets in varying proportions and at the termination of said interval all of the fluid will flow through the selected outlet. Thus interruption of flow during a period of directional change is avoided, and, when the casing apertures, both inlet and outlet as well as the recessed portion of the plug 10, are all so proportioned as to present the same cross sectional area to the stream of fluid flowing through the device, expansion or contraction of the fluid within the device due to such passage is avoided. This feature of the invention is particularly important in its adaptation to directional control of fluid in the vapor state flowing through the device at high temperature.

When operating the device to effect a change in fluid flow destination (particularly when handling coking or corrosive vapors) the turning of the plug 10 within the casing 11 may be facilitated by means of the sliding mechanism hereinbefore referred to. This is effected by occasioning a slight lateral movement of plug 10 prior to turning same. To withdraw said plug from its seat in the casing 11, the nut 28 is turned on the bolt 25. The pressure thus brought to bear upon the collar 27 carried by the plug 10 is transmitted to said plug through the collar 26 rigidly attached thereto by threaded connection and the desired movement of the plug out of its seat in the casing is effected. Prior to turning the nut 28, the nut 29 must first be loosened, of course, in order to remove an otherwise balancing counter-pressure exerted thereby upon the collar 27. Reseating of plug within the casing is effected by a reverse operation of the sliding mechanism, loosening the nut 28 and tightening the nut 29.

I claim:

A valve adapted to effect directional changes in a flowing stream of fluid at high temperature and pressure, comprising a valve casing, an inlet located at one end thereof, a plurality of outlets circumferentially disposed in said casing, a plug projecting into said casing and adapted to turn therein, said plug comprising a cylindrical portion and a frustro-conical seating portion, said cylindrical portion being of the same diameter as the greatest diameter of said seating portion and of greater length than said frustro-conical portion, a smooth curved recess in said plug constituting a channel from the inner end of said seating portion to a port in the side wall thereof, a longitudinal channel extending into said plug from the end opposite said recess to within proximity of said recess, means comprising a tubular conduit slightly shorter than said longitudinal channel for introducing a cooling fluid into said longitudinal channel, a plurality of transverse exhaust channels extending from the annular passage between said tubular conduit and walls of said longitudinal channel to the outside of said plug for exhausting said cooling fluid, and actuating means connected to said plug for turning said plug in said casing to cause said inlet to selectively communicate with any one of said outlets.

LUIS DE FLOREZ.